(12) United States Patent
Wang et al.

(10) Patent No.: US 10,908,359 B2
(45) Date of Patent: Feb. 2, 2021

(54) ADJUSTABLE WIDE-SPECTRUM WAVELENGTH-INSENSITIVE DIRECTIONAL COUPLER

(71) Applicant: Henan Shijia Photons Technology Co., Ltd., Hebi (CN)

(72) Inventors: Liangliang Wang, Hebi (CN); Jiashun Zhang, Hebi (CN); Junming An, Hebi (CN); Xiaojie Yin, Hebi (CN); Jianguang Li, Hebi (CN); Hongjie Wang, Hebi (CN); Yuanda Wu, Hebi (CN); Yue Wang, Hebi (CN); Xiongwei Hu, Hebi (CN)

(*) Notice: Subject to any disclaimer, the term of this patent is extended or adjusted under 35 U.S.C. 154(b) by 0 days.

(21) Appl. No.: 16/629,920

(22) PCT Filed: Aug. 13, 2018

(86) PCT No.: PCT/CN2018/100205
§ 371 (c)(1),
(2) Date: Jan. 9, 2020

(87) PCT Pub. No.: WO2019/034013
PCT Pub. Date: Feb. 21, 2019

(65) Prior Publication Data
US 2020/0142130 A1     May 7, 2020

(30) Foreign Application Priority Data
Aug. 14, 2017   (CN) .......................... 2017 1 0690935

(51) Int. Cl.
G02B 6/28     (2006.01)
G02B 6/38     (2006.01)
(Continued)

(52) U.S. Cl.
CPC ........... *G02B 6/283* (2013.01); *G02B 6/3827* (2013.01); *G02F 1/0147* (2013.01); *C01B 33/12* (2013.01)

(58) Field of Classification Search
CPC ........ G02B 6/283; G02B 6/3827; C01B 33/12
See application file for complete search history.

(56) References Cited

U.S. PATENT DOCUMENTS 5,418,868 A * 5/1995 Cohen .................... G02F 1/0147
                                                    385/130
7,254,299 B2 * 8/2007 Izhaky ................. G02B 6/1228
                                                    385/39

(Continued)

*Primary Examiner* — Sung H Pak
(74) *Attorney, Agent, or Firm* — Novoclaims Patent Services LLC; Mei Lin Wong (57) ABSTRACT

An adjustable wide-spectrum wavelength-insensitive directional coupler, comprising a substrate (100). A first-stage directional coupling structure (1), a phase-shifting structure (2), and a second-stage directional coupling structure (3) are sequentially connected and disposed on the substrate (100). The phase-shifting structure (2) comprises a phase-shifting curved waveguide, a phase-shifting straight waveguide (22), and a third modulation component (26), wherein the third modulation component (26) is disposed on the phase-shifting curved waveguide. One end of the phase-shifting curved waveguide is connected to an output end of a directional coupled waveguide I (16) of the first-stage directional coupling structure (1), and the other end of the phase-shifting curved waveguide is connected to an input end of a directional coupled waveguide III (30) of the second-stage directional coupling structure (3). One end of the phase-shifting straight waveguide (22) is connected to an output end of a directional coupled waveguide II (17) of the first-stage directional coupling structure (1), and the other end of the phase-shifting straight waveguide (22) is connected to an input end of a directional coupled waveguide IV (31) of the second-stage directional coupling structure (3). The adjust- (Continued)

able wide-spectrum wavelength-insensitive directional coupler achieves wide-spectrum wavelength-insensitivity, a wide spectrum of splitting-ratio adjustment and low loss, and is of a compact size for easy integration with other devices.

10 Claims, 4 Drawing Sheets

(51) Int. Cl.
*G02F 1/01* (2006.01)
*C01B 33/12* (2006.01)

(56) References Cited

U.S. PATENT DOCUMENTS

| | | | |
|---|---|---|---|
| 7,272,279 B2* | 9/2007 | Ishikawa | G02B 6/125 |
| | | | 385/39 |
| 2003/0169964 A1* | 9/2003 | Wang | G02B 6/2821 |
| | | | 385/27 |
| 2004/0151423 A1* | 8/2004 | Izhaky | G02B 6/1228 |
| | | | 385/21 |
| 2004/0208421 A1* | 10/2004 | Kitagawa | G01K 11/00 |
| | | | 385/16 |
| 2005/0185970 A1* | 8/2005 | Madsen | G02F 1/0136 |
| | | | 398/202 |
| 2008/0239465 A1* | 10/2008 | Hasegawa | H04B 10/677 |
| | | | 359/325 |
| 2017/0099529 A1* | 4/2017 | Dupuis | G02F 1/225 |
| 2017/0336564 A1* | 11/2017 | Soref | G02F 1/3136 |
| 2019/0219890 A1* | 7/2019 | Anderson | G02F 1/0121 |
| 2020/0142130 A1* | 5/2020 | Wang | G02B 6/26 |

* cited by examiner

ADJUSTABLE WIDE-SPECTRUM WAVELENGTH-INSENSITIVE DIRECTIONAL COUPLER

BACKGROUND OF THE PRESENT INVENTION

Field of Invention

The present invention relates to the technical field of fiber-to-the-home passive optical network, and more particularly to an adjustable wide-spectrum wavelength-insensitive coupler for fiber-to-the-home user allocation.

Description of Related Arts

With the rapid business development of 4 k video, AR/VR technology, Internet+, big data, cloud services, and etc., broadband networks are developing in the direction of ultra-bandwidth, intelligence and multi-service, which greatly stimulates the increase of bandwidth capacity of transmission networks and promotes fiber-to-the-home development. In a fiber-to-the-home passive optical network, a large number of splitters are needed for optical path allocation, and in some special scenarios, a dimmable splitter is needed to achieve dynamic and flexible optical path allocation. The existing dimmable splitter generally adopts the form of electro-optical, acousto-optic or multi-mode interference structure, and the use of electro-optical and acousto-optic technology is complicated and is not conducive to large-scale production. A tunable optical splitter with a multimode interference structure requires multiple stages of branching or coupling structures. The size is large, the modulation depth is not enough, and it can only work at a specific wavelength. Thus it is unable to meet the needs of broad spectrum of optical communication networks.

SUMMARY OF THE PRESENT INVENTION

The present invention provides an adjustable wide-spectrum wavelength-insensitive coupler which is compact is size and is insensitive to wavelength in view of the shortcomings of wavelength sensitivity of existing tunable couplers.

In order to solve the above technical problems, the technical solutions adopted by the present invention are as follows:

An adjustable wide-spectrum wavelength-insensitive directional coupler, which comprises a substrate; a first-stage directional coupling structure, a phase-shifting structure, and a second-stage directional coupling structure sequentially disposed on the substrate; wherein the phase-shifting structure comprises a phase shifting arc-shaped waveguide, a phase shifting straight waveguide and a third modulating component, wherein the third modulating component is disposed on the phase shifting arc-shaped waveguide; the phase shifting arc-shaped waveguide has one end connected to an output terminal of a directional coupling waveguide I of the first-stage directional coupling structure, the phase shifting arc-shaped waveguide has another end connected to an input terminal of a directional coupling waveguide III of the second-stage directional coupling structure, the phase shifting straight waveguide has one end connected to an output terminal of a directional coupling waveguide II of the first-stage directional coupling structure, the phase shifting straight waveguide has another end connected to an input terminal of a directional coupling waveguide IV of the second-stage directional coupling structure. The substrate is silicon dioxide, silicon, SOI, indium phosphide or a semiconductor polymer. The first-stage directional coupling structure, the phase-shifting structure, and the second-stage directional coupling structure are each made of an optical waveguide material. The optical waveguide material is silicon dioxide, silicon, indium gallium arsenide, a polymer or other semiconductor material.

The phase shifting arc-shaped waveguide comprises a first phase shifting arc-shaped waveguide, a second phase shifting arc-shaped waveguide, a third phase shifting arc-shaped waveguide, and a fourth phase shifting arc-shaped waveguide, the first phase shifting arc-shaped waveguide has one end connected to the output terminal of the directional coupling waveguide I, the first phase shifting arc-shaped waveguide has another end connected to one end of the second phase shifting arc-shaped waveguide, the second phase shifting arc-shaped waveguide has another end connected to one end of the third phase shifting arc-shaped waveguide, the third phase shifting arc-shaped waveguide has another end connected to one end of the fourth phase shifting arc-shaped waveguide, the fourth phase shifting arc-shaped waveguide has another end connected to the input terminal of the directional coupling waveguide III; an arc formed by connecting the first phase shifting arc-shaped waveguide and the second phase shifting arc-shaped waveguide is symmetrical to an arc formed by connecting the third phase shifting arc-shaped waveguide and the fourth phase shifting arc-shaped waveguide, and a bending direction of the first phase shifting arc-shaped waveguide is opposite to a bending direction of the second phase shifting arc-shaped waveguide.

The third modulation component is an electrical modulation component with a U-shaped structure or a thermal modulation component with a U-shaped structure.

The first-stage directional coupling structure comprises a first input waveguide component and a second input waveguide component which are parallel to each other, the first input waveguide component comprises an input waveguide I, an arc-shaped waveguide I, an arc-shaped waveguide II, a directional coupling waveguide I and a first modulation component I; the input waveguide I has one end constructed as an optical entrance port, the input waveguide I has another end in contact connection with one end of the arc-shaped waveguide I, the arc-shaped waveguide I has another end in contact connection with one end of the arc-shaped waveguide II, the arc-shaped waveguide II has another end in contact connection with one end of the directional coupling waveguide I, the directional coupling waveguide I has another end in contact connection with one end of the first phase shifting arc-shaped waveguide, the first modulation component I is disposed on the substrate and is located at an outer side of the directional coupling waveguide I; the second input waveguide component comprises an input waveguide II, an arc-shaped waveguide III, an arc-shaped waveguide IV, a directional coupling waveguide II, and a first modulating component II, the input waveguide II has one end constructed as another optical port, the input waveguide II has another end in contact connection with one end of the arc-shaped waveguide III, the arc-shaped waveguide III has another end in contact connection with one end of the arc-shaped waveguide IV, the arc-shaped waveguide IV has another end in contact connection with one end of the directional coupling waveguide II, the directional coupling waveguide II has another end in contact connection with one end of the phase-shifting straight waveguide, the first modulation component II is disposed on the substrate and is located at an outer side of the directional coupling waveguide II.

A contact portion between the input waveguide I and the arc-shaped waveguide I, a contact portion between the arc-shaped waveguide II and the directional coupling waveguide I, a contact portion between the directional coupling waveguide I and the first phase-shifting arc-shaped waveguide, a contact portion between the input waveguide II and the arc-shaped waveguide III, and a contact portion between the arc-shaped waveguide IV and the directional coupling waveguide II are provided with a dislocation I respectively; a contact portion between the arc-shaped waveguide I and the arc-shaped waveguide II, and a contact portion between the arc-shaped waveguide III and the arc-shaped waveguide IV are provided with dislocation II respectively.

The first modulation component I and the first modulation component II are the same, and are an electrical modulation component or a thermal modulation component.

The second-stage directional coupling structure comprises a first output waveguide component and a second output waveguide component which are parallel to each other, the first output waveguide component includes an output waveguide I, an arc-shaped waveguide V, an arc-shaped waveguide VI, a directional coupling waveguide III and a second modulation component I; the output waveguide I has one end constructed as an optical output port, and the output waveguide I has another end in contact connection with one end of the arc-shaped waveguide V, the arc-shaped waveguide V has another end in contact connection with one end of the arc-shaped waveguide VI, the arc-shaped waveguide VI has another end in contact connection with one end of the directional coupling waveguide III, the directional coupling waveguide III has another end in contact connection with one end of the first phase shifting arc-shaped waveguide, the second modulation component I is disposed on the substrate and is located at an outer side of the directional coupling waveguide III; the second output waveguide component includes an output waveguide II, an arc-shaped waveguide VII, an arc-shaped waveguide VIII, a directional coupling waveguide IV, and a second modulating component II; the output waveguide II has one end constructed as another optical output port, the output waveguide II has another end in contact connection with one end of the arc-shaped waveguide VII, the arc-shaped waveguide VII has another end in contact connection with one end of the arc-shaped waveguide VII, the arc-shaped waveguide VII has one end in contact connection with one end of the directional coupling waveguide IV, the directional coupling waveguide IV 31 has another end in contact connection with another end of the phase-shifting straight waveguide, the second modulation component II is disposed on the substrate and is located at an outer side of the directional coupling waveguide IV.

A contact portion between the output waveguide I and the arc-shaped waveguide V, a contact portion between the arc-shaped waveguide VI and the directional coupling waveguide III, a contact portion between the directional coupling waveguide III and the first phase-shifting arc-shaped waveguide, a contact portion between the output waveguide II and the arc-shaped waveguide VII, and a contact portion between the arc-shaped waveguide VII and the directional coupling waveguide IV are provided with a dislocation I respectively; a contact portion between the arc-shaped waveguide V and the arc-shaped waveguide VI, and a contact portion between the arc-shaped waveguide VII and the arc-shaped waveguide VIII are provided with a dislocation II respectively.

The second modulation component I and the second modulation component II are the same, and are an electrical modulation component or a thermal modulation component.

The spacing between the input waveguide and the output waveguide of the present invention is an integral multiple of 127 µm or 250 µm.

The present invention has the following advantageous effect:

1) Through the use of two-stage directional coupler and cascading phase-shifting structures, the broad-spectrum and wavelength-insensitive features are achieved by optimizing the coupling length and phase shift size, while modulation is introduced into the coupling region and phase shifting, and adjustment of splitting ratio adjustment for broad-spectrum range is achieved by adjusting the coupling ratio and phase shift size.

2) Through the use of planar optical waveguide processing, a relatively low loss is achieved, and the size is compact, which is easy for integration with other devices.

BRIEF DESCRIPTION OF THE DRAWINGS

In order to more clearly illustrate the embodiments of the present invention or the technical solutions in the prior art, the drawings used in the embodiments or the description of the prior art will be briefly described below. Obviously, the drawings in the following description are only for illustrating certain embodiments of the present invention. For those skilled in the art without any creative work, other drawings can be obtained according to these drawings.

DETAILED DESCRIPTION OF THE PREFERRED EMBODIMENT

The technical solutions in the embodiments of the present invention are clearly and completely described in the following with reference to the accompanying drawings in the embodiments of the present invention. It is obvious that the described embodiments are only a part of the embodiments of the present invention, but not all embodiments. All other embodiments obtained by those of ordinary skill in the art based on the embodiments of the present invention without creative efforts are within the scope of the present invention.

Referring to FIGS. 1-3 and 6-7 of the drawings, an adjustable wide-spectrum wavelength-insensitive directional coupler includes a substrate 100, the substrate 100 is silicon dioxide, silicon, SOI, indium phosphide or a semiconductor polymer. A first-stage directional coupling structure 1, a phase-shifting structure 2, and a second-stage directional coupling structure 3 are sequentially disposed on the substrate 100. The first-stage directional coupling structure 1, the phase-shifting structure 2, and the second-stage directional coupling structure 3 are each made of an optical waveguide material 101. The optical waveguide material 101 is silicon dioxide, silicon, indium gallium arsenide, a polymer or other semiconductor material.

Figure 6:
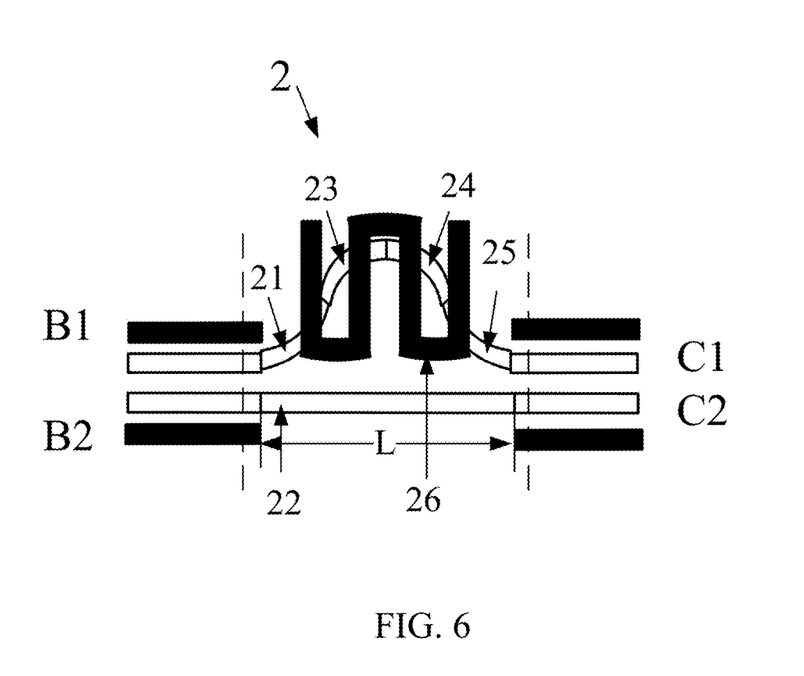
FIG. 6 is a schematic structural diagram showing a phase shifting structure of the present invention.

The phase-shifting structure 2 includes a phase shifting arc-shaped waveguide, a phase shifting straight waveguide 22 and a third modulating component 26. The third modulating component 26 is disposed on the phase shifting arc-shaped waveguide. The third modulation component 26 is an electrical modulation component with a U-shaped structure or a thermal modulation component with a U-shaped structure.

Figure 1:
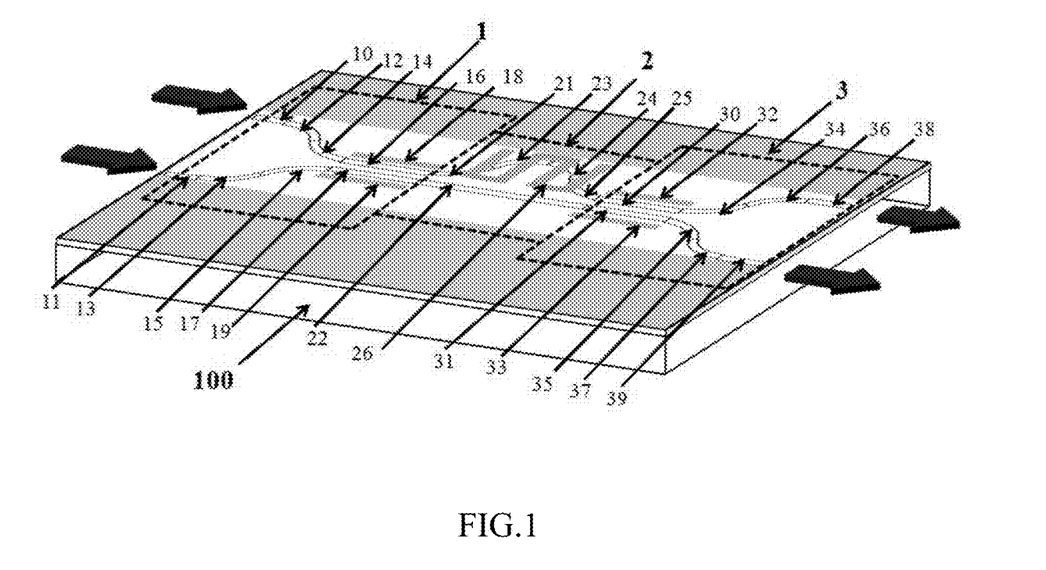
FIG. 1 is a schematic structural diagram of the present invention.

The phase shifting arc-shaped waveguide has one end connected to the output terminal of a directional coupling waveguide I 16 of the first-stage directional coupling structure 1. The phase shifting arc-shaped waveguide has another end connected to the input terminal of a directional coupling waveguide III 30 of the second-stage directional coupling structure 3. The phase shifting straight waveguide 22 has one end connected to the output terminal of the directional coupling waveguide II 17 of the first-stage directional coupling structure 1. The phase shifting straight waveguide 22 has another end connected to a connecting component of an input terminal of the directional coupling waveguide IV 31 of the second-stage directional coupling structure 3.

The phase shifting arc-shaped waveguide includes a first phase shifting arc-shaped waveguide 21, a second phase shifting arc-shaped waveguide 23, a third phase shifting arc-shaped waveguide 24, and a fourth phase shifting arc-shaped waveguide 25. The first phase shifting arc-shaped waveguide has one end connected to the output terminal of the directional coupling waveguide I 16. The first phase shifting arc-shaped waveguide has another end connected to one end of the second phase shifting arc-shaped waveguide 23. The second phase shifting arc-shaped waveguide 23 has another end connected to one end of the third phase shifting arc-shaped waveguide 24. The third phase shifting arc-shaped waveguide 24 has another end connected to one end of the fourth phase shifting arc-shaped waveguide 25. The fourth phase shifting arc-shaped waveguide 25 has another end connected to the input terminal of the directional coupling waveguide III 30. An arc formed by connecting the first phase shifting arc-shaped waveguide 21 and the second phase shifting arc-shaped waveguide 23 is symmetrical to an arc formed by connecting the third phase shifting arc-shaped waveguide 24 and the fourth phase shifting arc-shaped waveguide 25, and a bending direction of the first phase shifting arc-shaped waveguide 21 is opposite to a bending direction of the second phase shifting arc-shaped waveguide 23.

Figure 2:
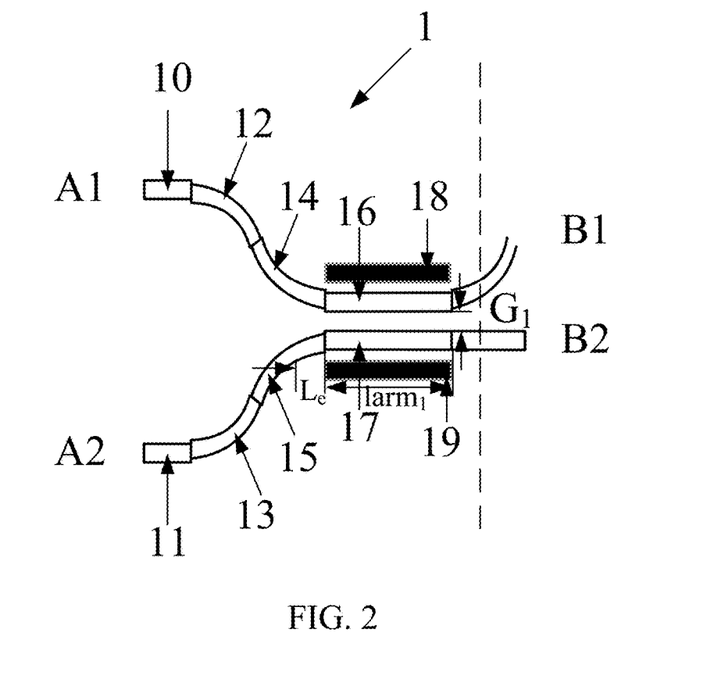
FIG. 2 is a schematic structural diagram of the first directional coupler of the present invention.

The first-stage directional coupling structure 1 includes a first input waveguide component and a second input waveguide component which are parallel to each other. The first input waveguide component includes an input waveguide I 10, an arc-shaped waveguide I 12, an arc-shaped waveguide II 14, a directional coupling waveguide I 16 and a first modulation component I 18. One end of the input waveguide I 10 is an optical entrance port, and the other end of the input waveguide I 10 is in contact connection to one end of the arc-shaped waveguide I 12. The other end of the arc-shaped waveguide I 12 is in contact connection to one end of the arc-shaped waveguide II 14. The other end of the arc-shaped waveguide II 14 is in contact connection to one end of the directional coupling waveguide I 16. The other end of the directional coupling waveguide I 16 is in contact connection to one end of the first phase shifting arc-shaped waveguide 21. The first modulation component I 18 is disposed on the substrate 100 and is located at an outer side of the directional coupling waveguide I 16. The second input waveguide component includes an input waveguide II 11, an arc-shaped waveguide III 13, an arc-shaped waveguide IV 15, a directional coupling waveguide II 17, and a first modulating component II 19. One end of the input waveguide II 11 is another optical port. The other end of the input waveguide II 11 is in contact connection to one end of the arc-shaped waveguide III 13. The other end of the arc-shaped waveguide III 13 is in contact connection to one end of the arc-shaped waveguide IV 15. The other end of the arc-shaped waveguide IV 15 is in contact connection with one end of the directional coupling waveguide II 17. The other end of the directional coupling waveguide II 17 is in contact connection with one end of the phase-shifting straight waveguide 22. The first modulation component II 19 is disposed on the substrate 100 and is located at an outer side of the directional coupling waveguide II 17.

The contact portion between the input waveguide I 10 with the arc-shaped waveguide I 12, the contact portion between the arc-shaped waveguide II 14 and the directional coupling waveguide I 16, the contact portion between the directional coupling waveguide I 16 and the first phase-shifting arc-shaped waveguide 21, the contact portion between the input waveguide II 11 and the arc-shaped waveguide III 13, and the contact portion between the arc-shaped waveguide IV 15 and the directional coupling waveguide II 17 are provided with a dislocation I respectively; the contact portion between the arc-shaped waveguide I 12 and the arc-shaped waveguide II 14, and the contact portion between the arc-shaped waveguide III 13 and the arc-shaped waveguide IV 15 are provided with dislocation II respectively.

Both of the first modulation component I 18 and the first modulation component II 19 are an electrical modulation component or a thermal modulation component.

Figure 7:
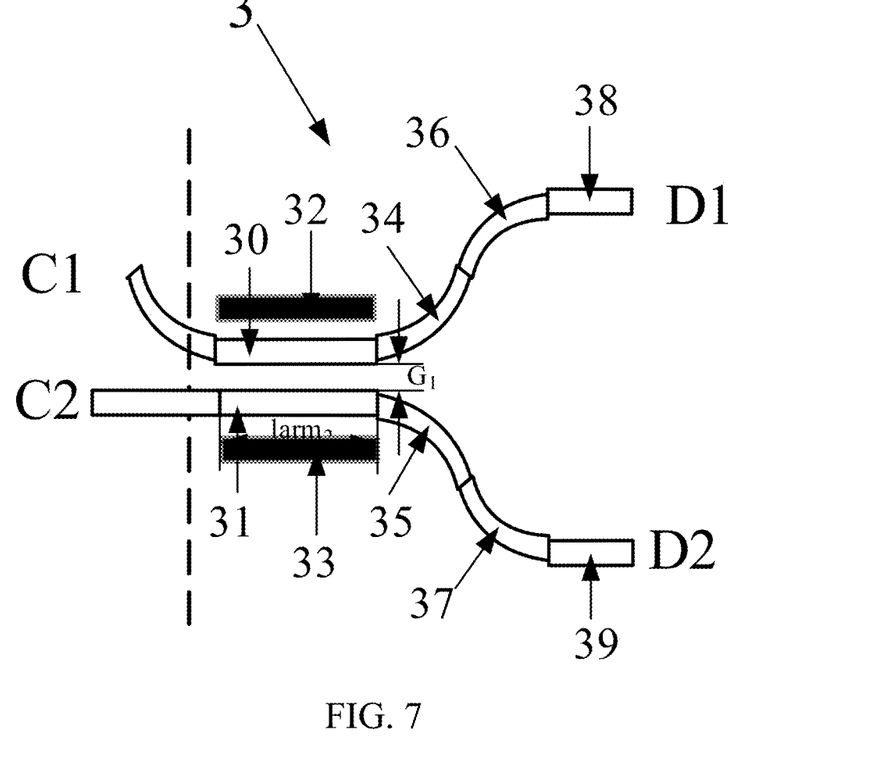
FIG. 7 is a schematic structural diagram of the second directional coupler of the present invention.

The second-stage directional coupling structure 3 includes a first output waveguide component and a second output waveguide component which are parallel to each other. The first output waveguide component includes an output waveguide I 38, an arc-shaped waveguide V 36, an arc-shaped waveguide VI 34, a directional coupling waveguide III 30 and a second modulation component I 32. One end of the output waveguide I 38 is an optical output port, and the other end of the output waveguide I 38 is in contact connection to one end of the arc-shaped waveguide V 36. The other end of the arc-shaped waveguide V 36 is in contact connection to one end of the arc-shaped waveguide VI 34. The other end of the arc-shaped waveguide VI 34 is in contact connection to one end of the directional coupling waveguide III 30. The other end of the directional coupling waveguide III 30 is in contact connection to another end of the first phase shifting arc-shaped waveguide 21. The second modulation component I 32 is disposed on the substrate 100 and is located at an outer side of the directional coupling waveguide III 30. The second output waveguide component includes an output waveguide II 39, an arc-shaped waveguide VII 37, an arc-shaped waveguide VIII 35, a directional coupling waveguide IV 31, and a second modulating component II 33. One end of the output waveguide II 39 is another optical output port. The other end of the output waveguide II 39 is in contact connection to one end of the arc-shaped waveguide VII 37. The other end of the arc-shaped waveguide VII 37 is in contact connection to one end of the arc-shaped waveguide VII 35. The other end of the arc-shaped waveguide VII 35 is in contact connection with one end of the directional coupling waveguide IV 31. The other end of the directional coupling waveguide IV 31 is in contact connection with another end of the phase-shifting straight waveguide 22. The second modulation component II 33 is disposed on the substrate 100 and is located at an outer side of the directional coupling waveguide IV 31.

The contact portion between the output waveguide I 38 and the arc-shaped waveguide V 36, the contact portion between the arc-shaped waveguide VI 34 and the directional coupling waveguide III 30, the contact portion between the directional coupling waveguide III 30 and the first phase-shifting arc-shaped waveguide 21, the contact portion between the output waveguide II 39 and the arc-shaped waveguide VII 37, and the contact portion between the arc-shaped waveguide VII 35 and the directional coupling waveguide IV 31 are provided with a dislocation I respectively; the contact portion between the arc-shaped waveguide V 36 and the arc-shaped waveguide VI 34, and the contact portion between the arc-shaped waveguide VII 37 and the arc-shaped waveguide VIII 35 are provided with dislocation II respectively.

The second modulation component I 32 and the second modulation component II 33 are the same, both of which is an electrical modulation component or a thermal modulation component.

The spacing between the input waveguide and the output waveguide of the present invention is an integral multiple of 127 µm or 250 µm.

The followings are explained with specific exemplary embodiments:

An adjustable wide-spectrum wavelength-insensitive coupler, which comprises: a substrate, an optical waveguide material, a first-stage directional coupling structure, a phase-shifting structure and a second-stage directional coupling structure, the first-stage directional coupling structure, the phase-shifting structure and the second-stage directional coupling structure are sequentially connected, are made of an optical waveguide material, and are fabricated on the substrate.

The substrate is made of a silicon dioxide material.

The optical waveguide material is selected from silicon dioxide material which are differently doped with a refractive index difference of 0.45%, and the calculation formula is:

$$\Delta n = \frac{n_1^2 - n_2^2}{2n_1^2}$$

Wherein the core layer is ytterbium-doped silicon dioxide material with a refractive index $n_1=1.4515$, the upper and lower cladding layers are boron-doped and phosphorus-doped silicon dioxide materials with a refractive index $n_2=1.445$, the waveguide bending radius=15 mm, the waveguide section size is 6.5 µm×6.5 µm.

Figure 3:
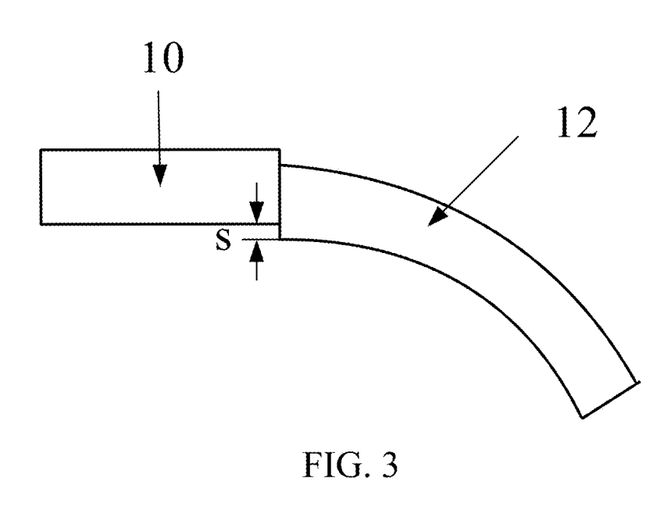
FIG. 3 is a schematic diagram showing the connecting portion of the arc waveguide and the straight waveguide of the present invention.
Figure 4:
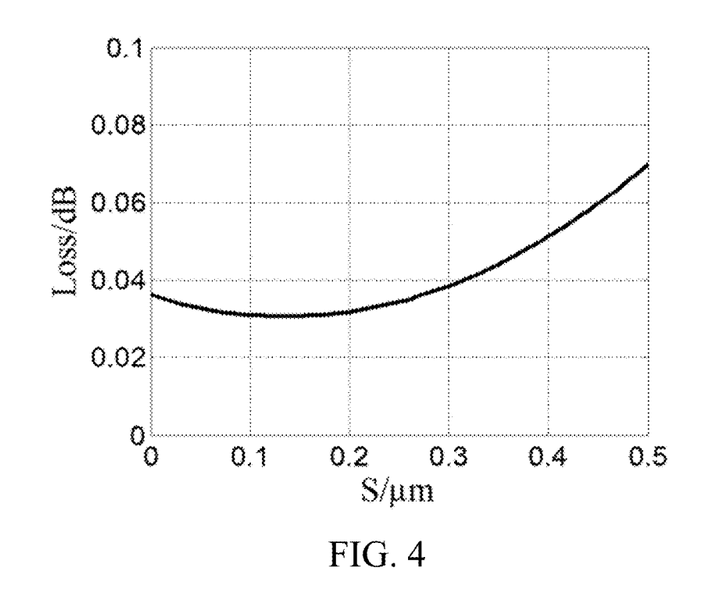
FIG. 4 is a trend chart showing the loss variation with dislocation of the present invention.

Due to the curvature of the arc-shaped waveguide, the light field is tilted, causing additional radiation loss at the junction between the arc-shaped waveguide and the arc-shaped waveguide, and between the arc-shaped waveguide and the straight waveguide. In order to reduce the device loss, the present invention introduces a dislocation structure and optimizes the dislocation structure. FIG. 3 is a schematic diagram of a connecting portion of the arc-shaped waveguide and the straight waveguide, and FIG. 4 is a variation trend of loss under different dislocation structures. It can be seen from FIG. 4 that when the dislocation gradually increases from 0, the loss has a tendency to gradually decrease. When the value increases to a certain value, the loss increases. This is mainly due to the large dislocation will result in a relatively large shift of the optical field, causing an increase in loss. Here, the positional arc-shaped waveguide and the straight waveguide dislocation value S=0.15 µm is selected. At this time, the coupling loss is the latest. The contact portion between the arc-shaped waveguide and the arc-shaped waveguide is the dislocation value of two curved fields, which is two times of the arc-shaped waveguide and the straight waveguide.

In this case, the coupling length of the first-stage directional coupling structure is larm1=2420 µm, the spacing between the directional coupling waveguide I and the directional coupling waveguide II is G1=2.8 µm, and the curved portion is a gradually broadening process due to the waveguide. Before extending to the uncoupling distance, there also exists coupling at the curved waveguide portion, and this portion is the equivalent coupling length Le, where the input is A1, A2, and the output is B1, B2. The transfer matrix expression of the first-stage directional coupling structure 1 is:

$$\begin{bmatrix} B1 \\ B2 \end{bmatrix} = \begin{bmatrix} T_1 & -jS_1 \\ -jS_1 & T_1 \end{bmatrix} \begin{bmatrix} A1 \\ A2 \end{bmatrix}$$

Figure 5:
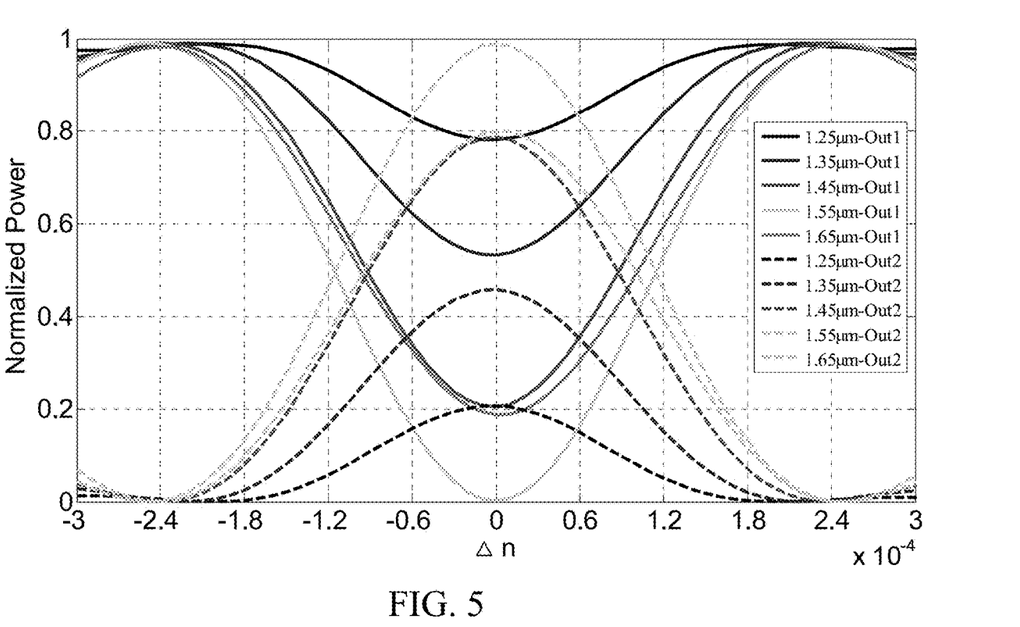
FIG. 5 illustrates the output power conversion of the coupler when the refractive index of the first directional coupler of the present invention changes.

Wherein:

$T_1 = \cos(\pi(Larm_1 + L_e)/2L_c)$ $S_1 = \sin(\pi(Larm_1 + L_e)/2L_c)$ $L_c = \pi/(\beta_e - \beta_o)$ $\beta_e$, $\beta_o$ refers to the propagation constant of the intrinsic even and odd symmetric mode in the coupler By modulating the coupler region by the first modulation component I and the first modulation component II, a direction coupling structure of different output powers can be obtained. In this embodiment, the three-dimensional beam propagation method is used and the different wavelengths from 1.25 µm to 1.65 µm are selected for simulation. FIG. 5 is a change in coupler output power when the coupler simulates a change in refractive index, where a positive value of $\Delta n$ represents the operation of the first thermal modulation structure and a negative value of $\Delta n$ represents the operation of the second thermal modulation structure. It can be seen from FIG. 5 that at a wavelength of 1.55 µm, under a static condition, the splitting ratio of the two output channels under a static condition is 50%: 50%. Through adjusting the thermal modulation component, when the change value of the refractive index is $\Delta n = +/- 0.00025$, the splitting ratio of the two output channels is 100%:0%/0%: 0%. Through thermal modulation, any split ratio adjustment can be achieved in the range of 1.25 µm to 1.65 µm.

The length of the straight waveguide of the phase shifting structure is L, the angle of the curved waveguide is angle, in the static state, the arc waveguide introduces a length difference $\Delta L$ is:

$\Delta L = 4 \cdot radius \cdot angle \cdot \pi / 180 - L$

Wherein angle=arc sin(L/(4·radius)), the corresponding introduced phase shift is:

$$\Delta phase = (4 \cdot radius \cdot angle \cdot \pi/180 - L) \cdot n_1$$

Through the modulating component, the refractive index of the arc-shaped waveguide is changed, and the phase shift size introduced by the phase shifter is changed.

Wherein the input is B1, B2, and the output is C1, C2. The transfer matrix expression of the phase shift structure 2 is:

$$\begin{bmatrix} C1 \\ C2 \end{bmatrix} = \begin{bmatrix} e^{-j\beta L} & 0 \\ 0 & e^{-j\beta L + \Delta L} \end{bmatrix} \begin{bmatrix} B1 \\ B2 \end{bmatrix}$$

where β is the waveguide propagation constant.

In this embodiment, the coupling length of the second-stage directional coupling structure 3 is larm2=1885 μm, and the spacing between the directional coupling waveguide III and the directional coupling waveguide IV is the same the first-stage directional coupling structure, which is G1=2.8 μm, and the equivalent coupling length is Le, where the input is C1, C2, and the output is D1, D2. The transfer matrix expression of the first-stage directional coupling structure is:

$$\begin{bmatrix} D1 \\ D2 \end{bmatrix} = \begin{bmatrix} T_2 & -jS_2 \\ -jS_2 & T_2 \end{bmatrix} \begin{bmatrix} C1 \\ C2 \end{bmatrix}$$

Wherein:

$$T_2 = \cos(\pi(Larm_2 + L_e)/2L_c)$$

$$S_2 = \sin(\pi(Larm_2 + L_e)/2L_c)$$

$$L_c = \pi/(\beta_e - \beta_o)$$

$\beta_e$, $\beta_o$ refers to the propagation constant of the intrinsic even and odd symmetric mode in the coupler.

From the above discussion, we can conclude that the transfer matrix expression of the adjustable wavelength-insensitive coupler is:

$$\begin{bmatrix} D1 \\ D2 \end{bmatrix} = \begin{bmatrix} T_2 & -jS_2 \\ -jS_2 & T_2 \end{bmatrix} \begin{bmatrix} e^{-j\beta L} & 0 \\ 0 & e^{-j\beta L + \Delta L} \end{bmatrix} \begin{bmatrix} T_1 & -jS_1 \\ -jS_1 & T_1 \end{bmatrix} \begin{bmatrix} A1 \\ A2 \end{bmatrix}$$

By the first-stage directional coupling structure, the phase shifting structure and the adjustment the splitting ratio and phase shift of the second-stage coupling by the first-stage directional coupling structure respectively, the wavelength-insensitive, wide-spectrum range splitting ratio adjustment is realized.

Figure 8:
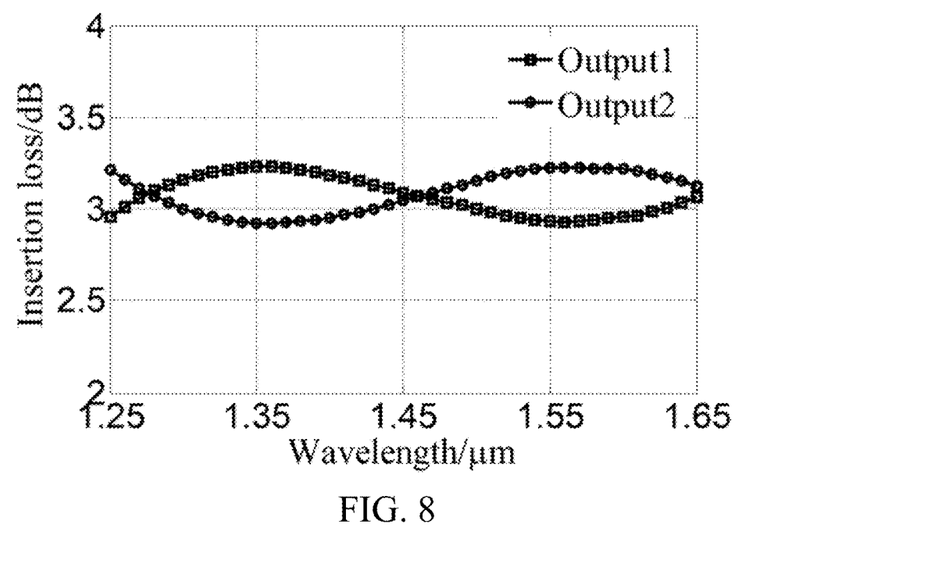
FIG. 8 illustrates the static output spectrum of the present invention.

In the static state, select the coupling length of the first-stage directional coupling structure as larm1=2420 μm, the coupling length of the second-stage directional coupling structure as larm2=1885 μm, and the angle of the arc-shaped waveguide of the phase-shifting structure as angle=2.2649, the length difference introduced by the arc-shaped waveguide as ΔL=0.7 μm, and its static input spectrum is shown in FIG. 8. In the wavelength range of 1.25 μm to 1.65 μm, IL, UNIF and WDL are less than 3.25 dB, 0.35 dB and 0.3 dB respectively. Wherein the calculation formulas of IL, UNIF and WDL are as follows:

$$IL_i = -10 \lg \left( \frac{P_{out_i}}{P_{in}} \right) (dB);$$

$$UNIF = -10 \lg \frac{(P_{out}) \min}{(P_{out}) \max} (dB);$$

$$WDL_i = -10 \lg \frac{(P_{out_i}) \min}{(P_{out_i}) \max} (dB).$$

The above is only the preferred embodiment of the present invention, and is not intended to limit the present invention. Any modifications, equivalent substitutions, improvements, etc., which are included in the spirit and scope of the present invention, should be included within the scope of protection of the present invention.

What is claimed is:

1. An adjustable wide-spectrum wavelength-insensitive directional coupler, characterized in that: comprising a substrate (100); a first-stage directional coupling structure (1), a phase-shifting structure (2), and a second-stage directional coupling structure (3) sequentially disposed on said substrate (100); wherein said phase-shifting structure (2) comprises a phase shifting arc-shaped waveguide, a phase shifting straight waveguide (22) and a third modulating component (26), wherein said third modulating component (26) is disposed on said phase shifting arc-shaped waveguide; said phase shifting arc-shaped waveguide has one end connected to an output terminal of a directional coupling waveguide I (16) of said first-stage directional coupling structure (1), said phase shifting arc-shaped waveguide has another end connected to an input terminal of a directional coupling waveguide III (30) of said second-stage directional coupling structure (3), said phase shifting straight waveguide (22) has one end connected to an output terminal of a directional coupling waveguide II (17) of said first-stage directional coupling structure (1), said phase shifting straight waveguide (22) has another end connected to an input terminal of a directional coupling waveguide IV (31) of said second-stage directional coupling structure (3), said phase shifting arc-shaped waveguide comprises a first phase shifting arc-shaped waveguide (21), a second phase shifting arc-shaped waveguide (23), a third phase shifting arc-shaped waveguide (24), and a fourth phase shifting arc-shaped waveguide (25), said first phase shifting arc-shaped waveguide (21) has one end connected to said output terminal of said directional coupling waveguide I (16), said first phase shifting arc-shaped waveguide (21) has another end connected to one end of said second phase shifting arc-shaped waveguide (23), said second phase shifting arc-shaped waveguide (23) has another end connected to one end of said third phase shifting arc-shaped waveguide (24), said third phase shifting arc-shaped waveguide (24) has another end connected to one end of said fourth phase shifting arc-shaped waveguide (25), said fourth phase shifting arc-shaped waveguide (25) has another end connected to said input terminal of said directional coupling waveguide III (30); an arc formed by connecting said first phase shifting arc-shaped waveguide (21) and said second phase shifting arc-shaped waveguide (23) is symmetrical to an arc formed by connecting said third phase shifting arc-shaped waveguide (24) and said fourth phase shifting arc-shaped waveguide (25), and a bending direction of said first phase shifting arc-shaped waveguide (21) is opposite to a bending direction of said second phase shifting arc-shaped waveguide (23).

2. An adjustable wide-spectrum wavelength-insensitive directional coupler, characterized in that: comprising a substrate (100); a first-stage directional coupling structure (1), a phase-shifting structure (2), and a second-stage directional coupling structure (3) sequentially disposed on said substrate (100); wherein said phase-shifting structure (2) comprises a phase shifting arc-shaped waveguide, a phase shifting straight waveguide (22) and a third modulating component (26), wherein said third modulating component (26) is disposed on said phase shifting arc-shaped waveguide; said phase shifting arc-shaped waveguide has one end connected to an output terminal of a directional coupling waveguide I (16) of said first-stage directional coupling structure (1), said phase shifting arc-shaped waveguide has another end connected to an input terminal of a directional coupling waveguide III (30) of said second-stage directional coupling structure (3), said phase shifting straight waveguide (22) has one end connected to an output terminal of a directional coupling waveguide II (17) of said first-stage directional coupling structure (1), said phase shifting straight waveguide (22) has another end connected to an input terminal of a directional coupling waveguide IV (31) of said second-stage directional coupling structure (3), said first-stage directional coupling structure 1 comprises a first input waveguide component and a second input waveguide component which are parallel to each other, said first input waveguide component comprises an input waveguide I (10), an arc-shaped waveguide I (12), an arc-shaped waveguide II (14), a directional coupling waveguide I (16) and a first modulation component I (18); said input waveguide I (10) has one end constructed as an optical entrance port, said input waveguide I (10) has another end in contact connection with one end of said arc-shaped waveguide I (12), said arc-shaped waveguide I (12) has another end in contact connection with one end of said arc-shaped waveguide II (14), said arc-shaped waveguide II (14) has another end in contact connection with one end of said directional coupling waveguide I (16), said directional coupling waveguide I (16) has another end in contact connection with one end of said first phase shifting arc-shaped waveguide (21), said first modulation component I (18) is disposed on said substrate (100) and is located at an outer side of said directional coupling waveguide I (16); said second input waveguide component comprises an input waveguide II (11), an arc-shaped waveguide III (13), an arc-shaped waveguide IV (15), a directional coupling waveguide II (17), and a first modulating component II (19), said input waveguide II (11) has one end constructed as another optical port, said input waveguide II (11) has another end in contact connection with one end of said arc-shaped waveguide III (13), said arc-shaped waveguide III (13) has another end in contact connection with one end of said arc-shaped waveguide IV (15), said arc-shaped waveguide IV (15) has another end in contact connection with one end of said directional coupling waveguide II (17), said directional coupling waveguide II (17) has another end in contact connection with one end of said phase-shifting straight waveguide (22), said first modulation component II (19) is disposed on said substrate (100) and is located at an outer side of said directional coupling waveguide II (17).

3. The adjustable wide-spectrum wavelength-insensitive directional coupler according to claim 2, characterized in that: a contact portion between said input waveguide I (10) and said arc-shaped waveguide I (12), a contact portion between said arc-shaped waveguide II (14) and said directional coupling waveguide I (16), a contact portion between said directional coupling waveguide I (16) and said first phase-shifting arc-shaped waveguide (21), a contact portion between said input waveguide II (11) and said arc-shaped waveguide III (13), and a contact portion between said arc-shaped waveguide IV (15) and said directional coupling waveguide II (17) are provided with a dislocation I respectively; a contact portion between said arc-shaped waveguide I (12) and said arc-shaped waveguide II (14), and a contact portion between said arc-shaped waveguide III (13) and said arc-shaped waveguide IV (15) are provided with dislocation II respectively.

4. The adjustable wide-spectrum wavelength-insensitive directional coupler according to claim 2, characterized in that: said first modulation component I (18) and the first modulation component II (19) are the same, and are an electrical modulation component or a thermal modulation component.

5. An adjustable wide-spectrum wavelength-insensitive directional coupler, characterized in that: comprising a substrate (100); a first-stage directional coupling structure (1), a phase-shifting structure (2), and a second-stage directional coupling structure (3) sequentially disposed on said substrate (100); wherein said phase-shifting structure (2) comprises a phase shifting arc-shaped waveguide, a phase shifting straight waveguide (22) and a third modulating component (26), wherein said third modulating component (26) is disposed on said phase shifting arc-shaped waveguide; said phase shifting arc-shaped waveguide has one end connected to an output terminal of a directional coupling waveguide I (16) of said first-stage directional coupling structure (1), said phase shifting arc-shaped waveguide has another end connected to an input terminal of a directional coupling waveguide III (30) of said second-stage directional coupling structure (3), said phase shifting straight waveguide (22) has one end connected to an output terminal of a directional coupling waveguide II (17) of said first-stage directional coupling structure (1), said phase shifting straight waveguide (22) has another end connected to an input terminal of a directional coupling waveguide IV (31) of said second-stage directional coupling structure (3), said second-stage directional coupling structure (3) comprises a first output waveguide component and a second output waveguide component which are parallel to each other, said first output waveguide component includes an output waveguide I (38), an arc-shaped waveguide V (36), an arc-shaped waveguide VI (34), a directional coupling waveguide III (30) and a second modulation component I (32); said output waveguide I (38) has one end constructed as an optical output port, and said output waveguide I (38) has another end in contact connection with one end of said arc-shaped waveguide V (36), said arc-shaped waveguide V (36) has another end in contact connection with one end of said arc-shaped waveguide VI (34), said arc-shaped waveguide VI (34) has another end in contact connection with one end of said directional coupling waveguide III (30), said directional coupling waveguide III (30) has another end in contact connection with one end of said first phase shifting arc-shaped waveguide (21), said second modulation component I (32) is disposed on said substrate (100) and is located at an outer side of said directional coupling waveguide III (30); said second output waveguide component includes an output waveguide II (39), an arc-shaped waveguide VII (37), an arc-shaped waveguide VIII (35), a directional coupling waveguide IV (31), and a second modulating component II (33); said output waveguide II (39) has one end constructed as another optical output port, said output waveguide II (39) has another end in contact connection with one end of said arc-shaped waveguide VII (37), said arc-shaped waveguide VII (37) has another end in contact connection with one end of said arc-shaped waveguide VII (35), said arc-shaped waveguide VII (35) has one end in contact connection with one end of said directional coupling waveguide IV (31), said directional coupling waveguide IV 31 has another end in contact connection with another end of said phase-shifting straight waveguide (22), said second modulation component II (33) is disposed on said substrate (100) and is located at an outer side of said directional coupling waveguide IV (31).

6. The adjustable wide-spectrum wavelength-insensitive directional coupler according to claim 5, characterized in that: a contact portion between said output waveguide I (38) and said arc-shaped waveguide V (36), a contact portion between said arc-shaped waveguide VI (34) and said directional coupling waveguide III (30), a contact portion between said directional coupling waveguide III (30) and said first phase-shifting arc-shaped waveguide (21), a contact portion between said output waveguide II (39) and said arc-shaped waveguide VII (37), and a contact portion between said arc-shaped waveguide VII (35) and said directional coupling waveguide IV (31) are provided with a dislocation I respectively; a contact portion between said arc-shaped waveguide V (36) and said arc-shaped waveguide VI (34), and a contact portion between said arc-shaped waveguide VII (37) and said arc-shaped waveguide VIII (35) are provided with a dislocation II respectively.

7. The adjustable wide-spectrum wavelength-insensitive directional coupler according to claim 5, characterized in that: said second modulation component I (32) and said second modulation component II (33) are the same, and are an electrical modulation component or a thermal modulation component.

8. The adjustable wide-spectrum wavelength-insensitive directional coupler according to claim 2, characterized in that: said substrate (100) is silicon dioxide, silicon, SOI, indium phosphide or a semiconductor polymer.

9. The adjustable wide-spectrum wavelength-insensitive directional coupler according to claim 1, characterized in that: said third modulation component (26) is an electrical modulation component with a U-shaped structure or a thermal modulation component with a U-shaped structure.

10. The adjustable wide-spectrum wavelength-insensitive directional coupler according to claim 5, characterized in that: said substrate (100) is silicon dioxide, silicon, SOI, indium phosphide or a semiconductor polymer.

* * * * *